(12) United States Patent
Kennedy

(10) Patent No.: US 10,393,279 B1
(45) Date of Patent: Aug. 27, 2019

(54) SPRING LOADED CHECK VALVE

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 15/916,357

(22) Filed: Mar. 9, 2018

(51) Int. Cl.
*F16K 15/03* (2006.01)
*F16K 27/02* (2006.01)
(52) U.S. Cl.
CPC .......... *F16K 15/033* (2013.01); *F16K 15/031* (2013.01); *F16K 27/0227* (2013.01)
(58) Field of Classification Search
CPC .............................. F16K 15/033; F16K 15/031
USPC ........................................................ 137/527
See application file for complete search history.

(56) References Cited

U.S. PATENT DOCUMENTS 6,050,294 A * 4/2000 Makowan ............... E03B 7/077
137/527
9,752,692 B2 9/2017 Abouelleil et al.

FOREIGN PATENT DOCUMENTS

CA 2951336 A1 * 7/2017 ........... F16K 15/031

* cited by examiner

*Primary Examiner* — P. Macade Nichols
(74) *Attorney, Agent, or Firm* — Brown & Michaels, PC

(57) ABSTRACT

A spring return check valve that has a body forming a fluid flow path therethrough, a cover that closes an opening in the body and including a cavity therein facing the fluid flow path, a disc that rotates from a first position closing the fluid flow path and a second position fully opening the fluid flow path and a spring connected between the cover and the disc and including extensions integrally extending from each end of the spring to cause the spring to buckle into the cavity when the disc rotates to the second position.

22 Claims, 6 Drawing Sheets

SPRING LOADED CHECK VALVE

BACKGROUND OF THE INVENTION

Field of the Invention

The invention pertains to the field of resilient hinged check valves. More particularly, the invention pertains to resilient hinged check valves with a spring loaded flapper disc that can compensate for fluid pressure surges and waves.

Description of Related Art

FIG. 1A shows a hinged check valve 100. The check valve 100 includes a body 102 including a cover plate 104 fastened to the body 102 with bolts 106. A recess 108 is formed between the cover plate 104 and the body 102. A flapper disc 110 is disposed in the valve 100 and includes a proximate end 110a, middle portion 110b, a distal end 110c and a resilient hinge 112 connecting the proximate end 110a with the middle portion 110b. The proximate end 110a is fixed in the recess 108 to hold the disc 110 in place. Fluid flows through the valve 100 from the inlet 114 through the outlet 116. As illustrated in FIG. 1A, when there is no flow of fluid through the check valve the flapper disc 110 remains in a closed position. A backflow jack assembly 118 may be used to drain the pipes in which the check valve is connect as well as performing other types of maintenance on the check valve.

FIG. 1B shows the check valve 100 in the open position. When a pump (not illustrated in order to provide brevity to the Description of Related Art) is turned on and fluid flows from the inlet 114 to the outlet 116, due to the force of the fluid, the disc 110 swings open on the resilient hinge 112. However, when the flow of the fluid stops or reverses direction, i.e., the pump turns off, the disc 110 can slam shut due to the reverse force of the fluid, thus causing "water hammer," which is a pressure surge or wave that can break the pipes in which the fluid flows through. Further, the long stroke of the disc 110 to open and close can also result in damage to the pipes since the disc 110 can accelerate over the long stroke and pick up force as it swings shut.

FIG. 2 shows a resilient check valve 200 according to U.S. Pat. No. 6,050,294. This check valve 200 includes a body 202, a main portion of the valve body 204, a stop structure 206 as part of the main portion of the valve body 204, a cover 208 and a top opening 210. The engagement between the main portion of the valve body 204 and the cover 208 defines a recess 212. The recess includes a flat portion 214 therein. The valve 200 also comprises a resilient disc 216 that includes a proximal end 218, a distal end 220, and a central portion 222. Within the disc 216 is a stiffening element 224 and a pin 226. The proximal end 218 of the disc 216 is connected to a pin 228 and rotates around the pin 228 when opening and closing. Both the proximal end 218 of the disc 216 and the pin 228 are accommodated in the recess 212.

The disc 216 is biased into a closed position by a leaf spring 230 which includes a proximal end 222, a central portion 224 and a distal end 236. A tip 238 of the proximal end of the spring 230 engages the main portion of the valve body 204 to prevent rotation or pivotal movement of the proximal end 232 of the spring 230 when the disc 216 is opening or closing. When the valve 200 is in the closed position a seal bead 240 at the distal end 220 of the disc 216 is pressed in contact with a seat 242 formed in the valve body 204. Upon flow of fluid through the body 204 from an inlet 244 to an outlet 246, the disc 216 swings upward to contact the stop structure 206. However, the leaf spring 230 is required to be thin in order to be accommodated within the valve cover 208, while also being required to be long enough to extend across the disc 216. As a result the leaf spring 230 lacks sufficient leverage to control movement of the disc 216. Thus, as the fluid stops flowing or reverses direction, the disc 216 tends to accelerate due to the force of the fluid, resulting in a pressure surge or wave in the fluid, or "water hammer."

Therefore there is a need for a check valve with a more efficiently controlled disc to compensate for pressure surges or waves in the fluid that flows through the valve.

SUMMARY OF THE INVENTION

The foregoing and other features of the present inventive concept are achieved by providing a spring return check valve, including: a valve body that can include an inlet and an outlet to define a fluid flow path therethrough, a cover connected to a side of an opening in the body and including a cavity formed into a first surface thereof facing the opening, the cover configured to move between a position covering the opening and a position exposing the opening; a disc disposed within the valve body and connected at one end of a first portion thereof to the valve body such that a second portion of the disc rotates between a position to open the fluid flow path and a position to close the fluid flow path; and a spring connected between a surface of the disc and the cover.

In an exemplary embodiment, a recess can be formed between the cover and the body in which the one end of the first portion of the disc is connected.

In another exemplary embodiment, the recess can be disposed between the cover and the valve body.

In another exemplary embodiment, the valve body can include a seat extending therein configured to be contacted by the second portion of the disc when the fluid flow path is closed.

In yet another exemplary embodiment, the cover may further include: a projection extending from the first surface thereof and configured to limit the rotation of the second portion of the disc by a predetermined amount away from the seat to the fully opened position of the fluid flow path.

In still another exemplary embodiment, wherein the spring can be a buckling spring with a straight coil body including eyelets integrally extending from each end thereof, the eyelets being offset from the spring body in a same direction with respect to body such that the buckling spring buckles in a direction opposite to the direction in which the eyelets are offset and into the cavity of the cover when the second portion of the disc rotates toward the open position of the fluid flow path.

In still another exemplary embodiment, the first portion of the disc can be formed of a flexible material such that the end connected to the recess does not rotate while the second portion of the disc rotates.

In still another exemplary embodiment, the check valve can further include a first spring hinge pin connected to the disc and configured to extend through one of the eyelets of the buckling spring and a second spring hinge pin connected to the cover and configured to extend through the other one of the eyelets of the buckling spring, the two spring hinge pins extending in parallel.

In yet another exemplary embodiment, the first and second spring hinge pins can include a rubber cap to securely extend over an end thereof to prevent the eyelets of the spring from sliding off the respective spring hinge pin.

The foregoing and other features of the present inventive concept are achieved by providing a spring return check valve, including: a valve body including fluid flow path therethrough; a cover rotatable to expose an opening in the valve body and to close the opening in the valve body, the cover including: a cavity formed therein facing the fluid flow path; and a protrusion extending therefrom toward the fluid flow path; a disc including: a first portion having a first end and a second end, the first end secured in a recess formed between the valve body and the cover; and a second portion connected to the second end of the first portion and rotatable between a first position to close the fluid flow path and a second position in contact with the protrusion wherein the fluid flow path is fully opened; and a spring connected between the disc and a surface of the cover within the cavity.

In an exemplary embodiment, the spring can be a buckling spring with a straight body portion including eyelets integrally extending from each end thereof which are offset to one side of the body to cause the spring to buckle in a direction opposite to the side of the body in which the eyelets are offset.

In another exemplary embodiment, the cover and the disc can each include a spring retention member in which a respective eyelet of the spring is connected.

In still another exemplary embodiment, the spring retention members can include a spring hinge pin in which the respective eyelet slides onto.

In still another exemplary embodiment, the first portion of the disc can be formed of a flexible material such that the first end does not rotate within the recess when the second portion of the disc rotates between the first and second positions.

In still another exemplary embodiment, the valve body can include a seat within the fluid flow path in which the second portion of the disc contacts when in the first position, and the protrusion can be formed such that the rotation of the second portion of the disc away from the seat to the fully opened position of the fluid flow path allows the second portion of the disc to rotate by a predetermined amount.

In yet another exemplary embodiment, the rotation amount of the second portion of the disc is 35 degrees.

In still another exemplary embodiment, the buckling spring can be formed of stainless steal.

In still another exemplary embodiment, the buckling spring can be formed to increase a biasing force as the spring extends to a fully straight position In yet another exemplary embodiment, the second portion of the disc can be formed of a non-flexible material.

The foregoing and other features of the present inventive concept are achieved by providing a check valve, including: a body including a fluid flow path extending therethrough, a cavity extending away from the fluid flow path, and a recess formed therein; a disc including a flexible first portion having a first end secured within the recess and a second end connected to a second portion of the disc, the second portion of the disc configured to rotate between one position closing the fluid flow path and a second position fully opening the fluid flow path; and a spring connected between the body and the disc and having a shape which causes the spring to buckle into the cavity as the disc rotates toward the open position.

In an exemplary embodiment, the body can further include a protrusion extending into the fluid flow path to limit the rotation of the second portion of the disc toward the second position by a predetermined amount.

In yet another exemplary embodiment, the spring can be a buckling spring having a straight coil body including an eyelet integrally extending from each end thereof, each eyelet being offset from the body to cause the spring to buckle in a predetermined direction when the eyelets are forced toward each other.

DETAILED DESCRIPTION OF THE INVENTION

Figure 1A:
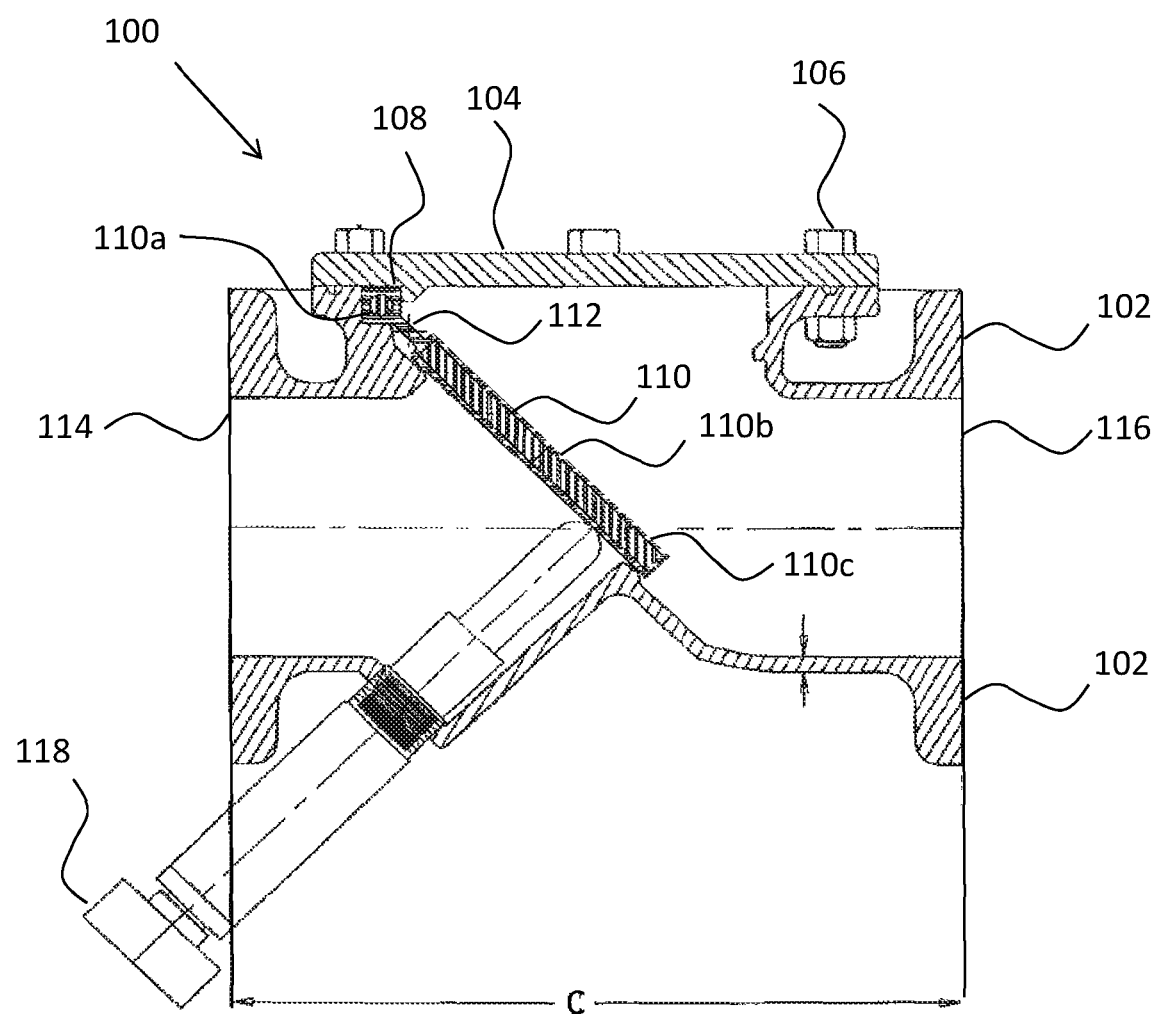
FIG. 1A shows a conventional check valve with a resilient disc in a closed position.
Figure 1B:
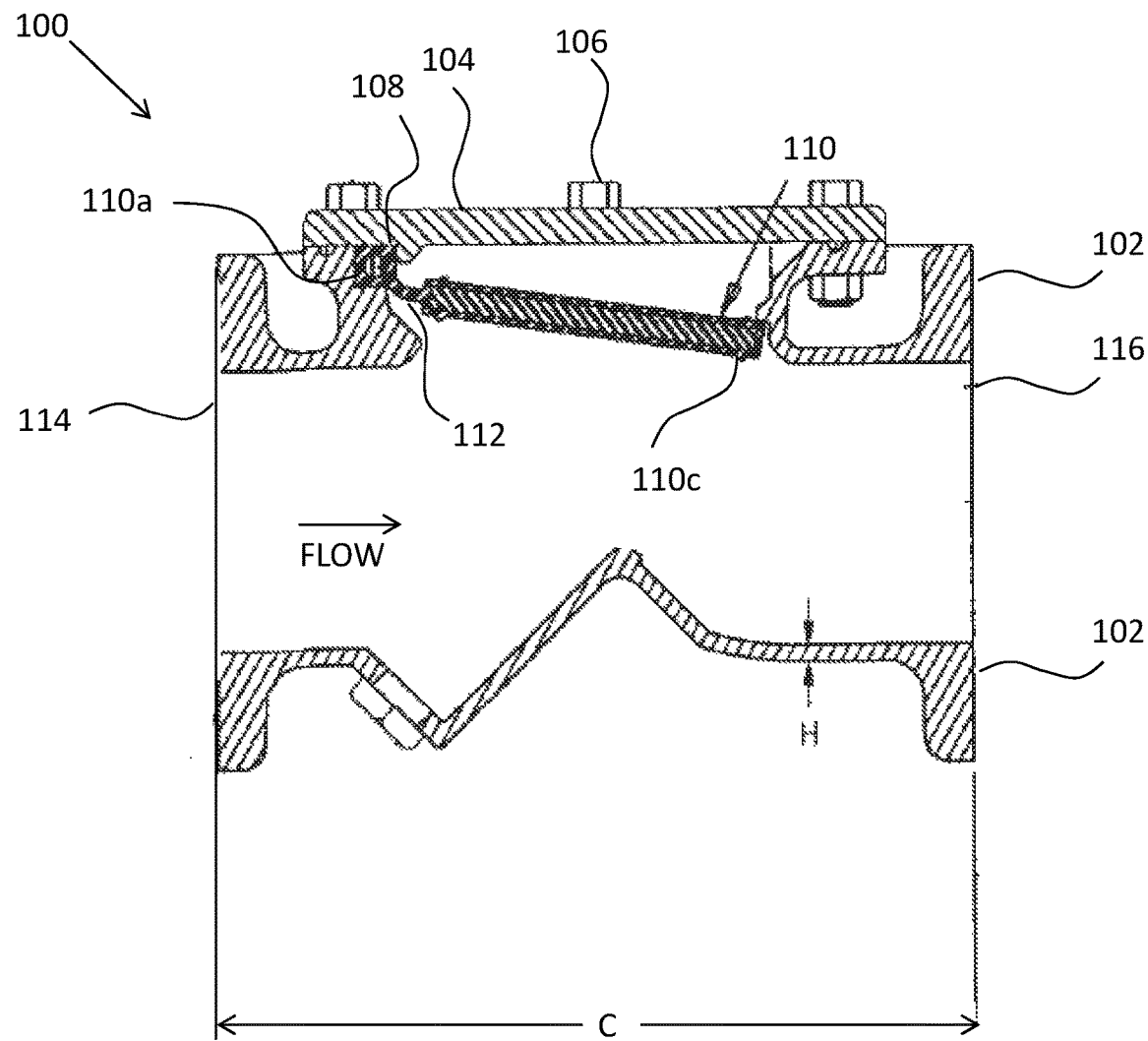
FIG. 1B shows the conventional check valve of FIG. 1A with the resilient disc in an open position.
Figure 2:
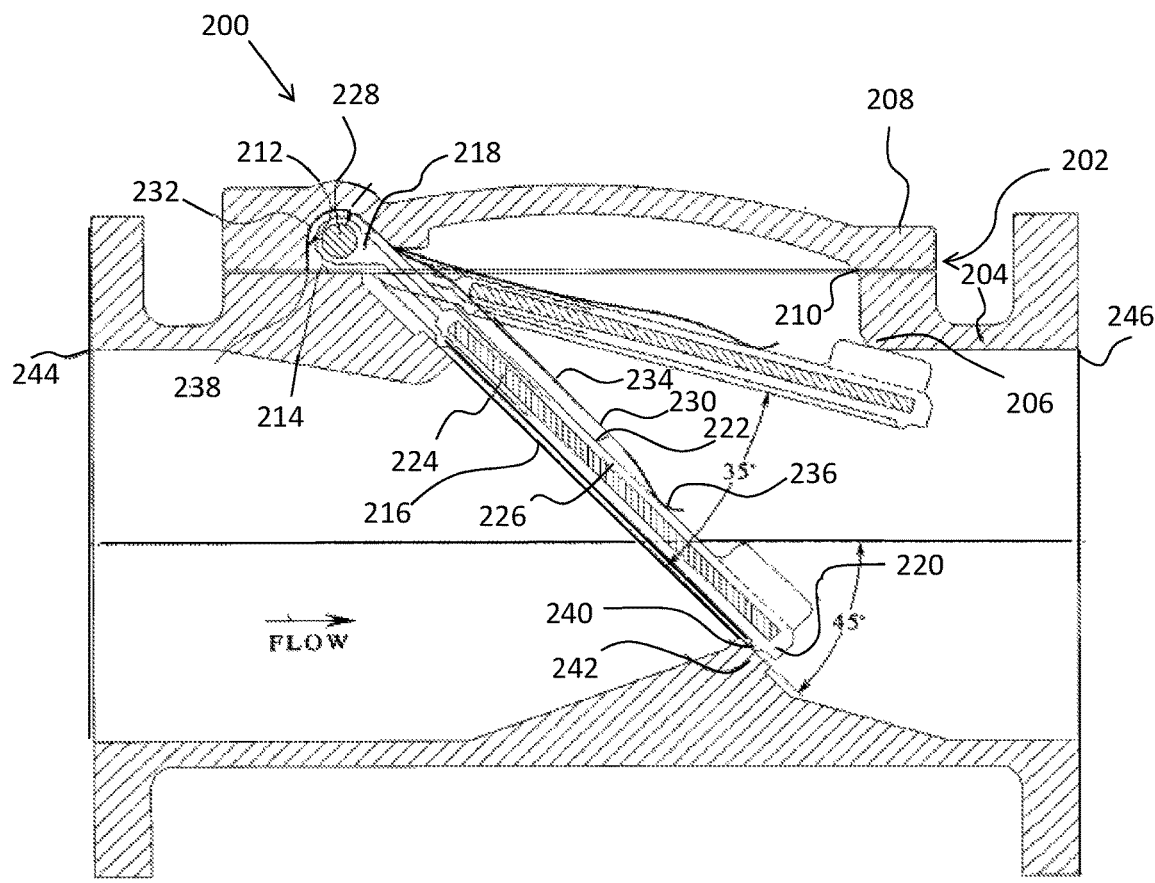
FIG. 2 shows another conventional check valve which uses a leaf spring to close a valve disc.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, this disclosure pertains to resilient hinged check valves. More particularly, the invention pertains to resilient hinged check valves with a spring loaded flapper disc that can compensate for fluid pressure surges and waves.

Figure 3:
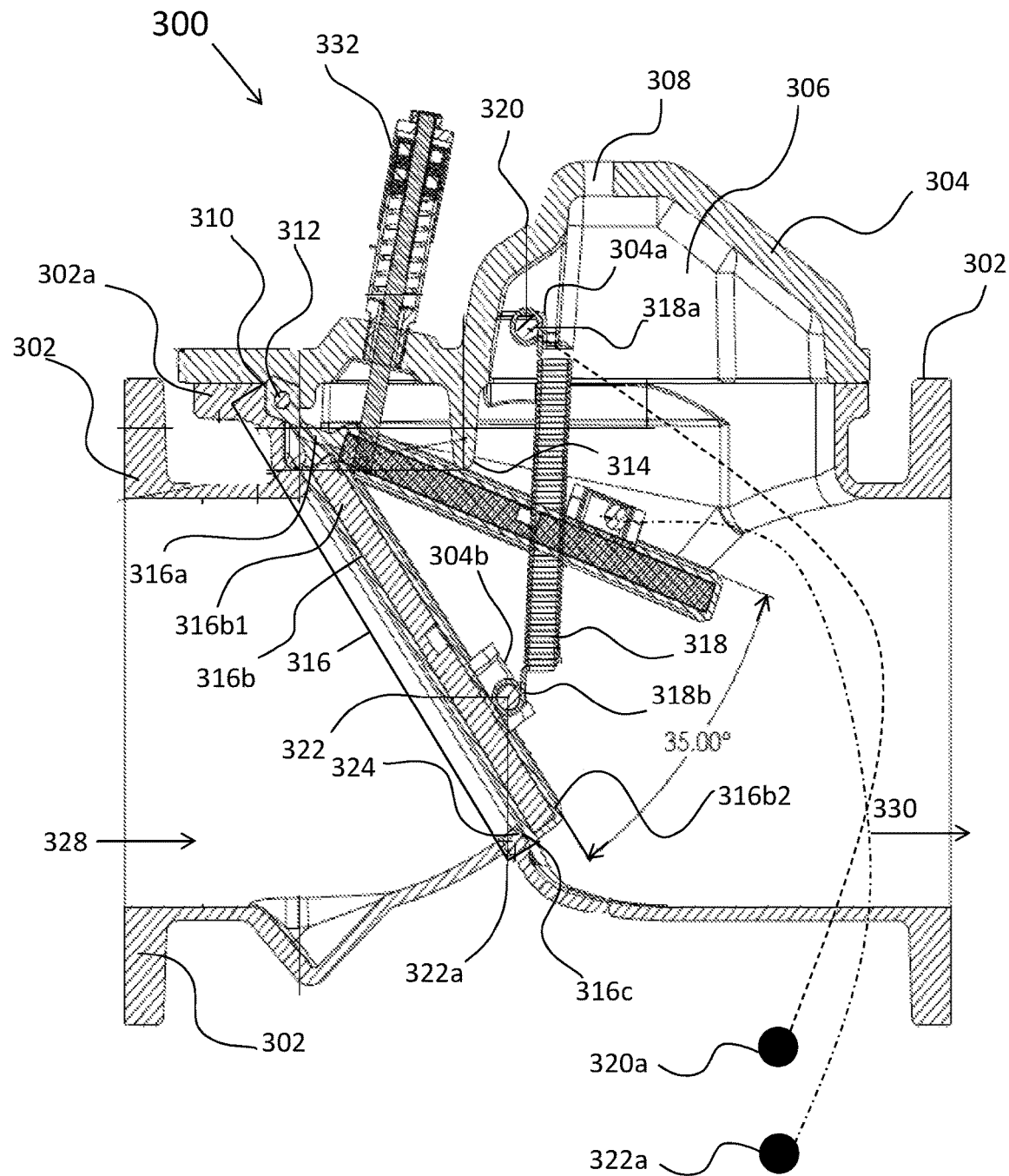
FIG. 3 shows a check valve with a resilient disc according to an exemplary embodiment of the present invention.

FIG. 3 shows a check valve 300 with a resilient disc 316 according to an embodiment of the inventive concept. The check valve 300 includes a valve body 302 and a main portion 302a of the valve body 302. The check valve 300 can also include a cover 304 having a cavity 306 formed therein and a hole 308 for lifting/opening the cover 304 for bleeding the valve 300 during testing of the valve 300 itself and/or testing the fluid flow through the valve 300. The hole 308 may have a national pipe thread (NPT), but is not limited thereto. The engagement between the main portion 302a of the valve body 302 and the cover 304 can define a recess 310. The cover 304 can include an optional indicator 332 to indicate a flow rate of the fluid within the valve 300. Alternatively the valve body 302 may include the cavity formed directly therein without a cover 304.

The valve 300 can also include a resilient disc 316 that includes a first portion 316a that is flexible, and a second portion 316b including a proximal end $316b_1$ and a distal end $316b_2$. The distal end $316b_2$ of the disc 316 can include a seal bead 316c disposed at an end thereof. A first end of the first portion 316a of the disc 316 is connected to the proximal end $316b_1$ and a second end of the first portion 316a can include a hole that extends therethrough to receive a rod 312 therein. Both the second end of the first portion 316a of the disc 316 and the rod 312 are accommodated in the recess 310 in a non-rotatable state. The first portion 316a of the disc 316 can be made of a flexible material, such as, for example rubber, thus being able to flex back and forth as the second portion 316b of disc 316 swings between open and closed states (described in more detail below) while the rod 312 and the second end of the first portion 316a remain in the non-rotatable state within the recess 310. The first portion 316a of the disc 316 can also include multiple layers of wire or fabric mesh within the rubber material to provide added strength and to resist breaking. Alternatively the first portion 316a can be formed of any flexible material or combination of materials that will perform the intended purposes of the disc 316, as described herein.

As illustrated in FIG. 3, a "buckling spring" 318 is connected between an inside surface of the cover 304 and the disc 316. The bucking spring 318 can be connected within the cavity 306 of the cover 304 and one side of the disc 316. The bucking spring 318 may include a first eyelet 318a that is connected to a first spring retention member 304a of the cover 304, which in turn is connected to the inside surface of the cover 304. The buckling spring 318 also can also include a second eyelet 318b that is connected to a second spring retention member 304b, which in turn is connected to one side of the second portion 316b of the disc 316 facing the cover 304. While the buckling spring 318 is made from a corrosion resistant material, such as, for example stainless steel, the buckling spring 318 can be made from any spring-appropriate material. A corrosion-resistant material can improve the lifespan of the buckling spring 318.

The first spring retention member 304a maintains a secure connection with the first eyelet 318a of the buckling spring 318 with the aid of a first spring hinge pin 320, which extends through the first eyelet 318a of the buckling spring 318. Likewise, the second spring retention member 304b maintains a secure connection with the second eyelet 318b of the buckling spring 318 with the aid of a second spring hinge pin 322, which extends through the second eyelet 318b of the buckling spring 318. As will be discussed in more detail below, both spring eyelets 318a and 318b are offset from a central axis of the coils of the buckling spring 318, as illustrated in FIG. 3. More specifically, the spring eyelets 318a and 318b are offset so that they are both shifted approximately past an exterior surface of the buckling spring 318. This shifting of the spring eyelets 318a and 318b ensures that the buckling spring 318 will fold/buckle in a predetermined direction (to a side of the spring 318 opposite to the side in which the spring eyelets 318a and 318b extend) as the second portion 316b of the disc 316 rotates towards the cover 304 as the disc 316 moves into an open position. Furthermore, as the buckling spring 318 bends it becomes less resistant to the pump force that forces the disc 316 to open. Therefore, as the buckling spring 318 begins to straighten while the disc 316 moves toward the seal bead 316c to a closing position, the buckling spring 318 becomes stronger, which results in a proportionately larger force being applied by the buckling spring 318 on the disc 316, which contributes to the acceleration of the disc 316 as it is closing. This design of the buckling spring 318 with the strategic positioning of the spring eyelets 318a and 318b therefore provides benefits of causing the buckling spring 318 to fold into the cavity 306 of the cover 304, applies proportionally less force on the disc 316 as the disc 316 is opening due to fluid flow, and applies a proportionately larger force on the disc 316 as the disc 316 is closing, thus further reducing the chances of water hammer, as described above.

The end of the first spring hinge pin 320 includes a rubber cap 320a (displaced from the first hinge pin 320 in order to illustrate the position of the first hinge pin 320), and the end of the second spring hinge pin 322 includes a rubber cap 322a (also displaced from the second hinge pin 322 in order to illustrate the position of the second spring hinge pin 322). The rubber caps 320a and 322a fit firmly over the respective end of the hinge pins 320 and 322, as illustrated by dotted lines, in order to secure the respective spring eyelets 318a and 318b from sliding off the respective hinge pins 320 and 322.

When the valve 300 is in a closed position, and thus no fluid is flowing therethrough, the seal bead 316c of the disc 316 is in contact with a seat 324 of the body 302, thus fully closing a fluid flow path through the valve 300. The fluid flow path of the valve 300 is in a fully opened position when the distal end 316b2 of the disc 316 (and thus the seal bead 316c) is rotated as far away from the seat 324 as possible. A force of the buckling spring 318, in its fully extended position (see FIG. 3), on the disc 316 ensures that the seal bead 316c and the seat 324 remain in contact when there is no fluid flow through the valve 300 to bias the seal bead 316c away from the seat 324.

Extending from the inside surface of the cover 304 is a cover protrusion 314 that protrudes therefrom toward the disc 316 (and into the fluid flow path) such that when fluid flows through the valve 300, the second portion 316b of the disc 316 rotates from the closed position (the seal bead 316c is in contact with the seat 324) toward the open position (the seal bead 316c is farthest away from the seat 324), and the top of the second portion 316b of the disc 316 makes contact with the cover protrusion 314 after rotating by a predetermined number of degrees. For illustration purposes, an inlet 328 of the valve 300 illustrates where the fluid is received and an outlet 330 of the valve 300 illustrates where the fluid exits the valve 300. The fluid flow path is open when fluid is flowing from the inlet 328 through the outlet 330 of the check valve 300, which causes the second portion 316b of the disc 316 to rotate towards the cover protrusion 314 and into the open position. The fluid flow path is fully open when the second portion 316b of the disc 316 is in contact with the cover protrusion 314.

The cover protrusion 314 can be formed such that the second portion 316b of the disc 316 can rotate by a predetermined amount before reaching the fully opened position. In an exemplary embodiment, the predetermined amount of rotation of the second portion 316b of the disc 316 before reaching the fully opening position (in contact with the cover protrusion 314) can be approximately 35 degrees. By permitting the disc 316 to open to approximately 35 degrees, there is less acceleration during closing of the disc 316, and more force applied by the buckle spring 318 on the disc 316 so that a stronger force is applied to close the disc 316. However, the cover protrusion 314 can be formed to extend to any desired length that will allow the disc 316 to extend to a fully opened position that performs the intended purposes of the inventive concept, as described herein.

Figure 4:
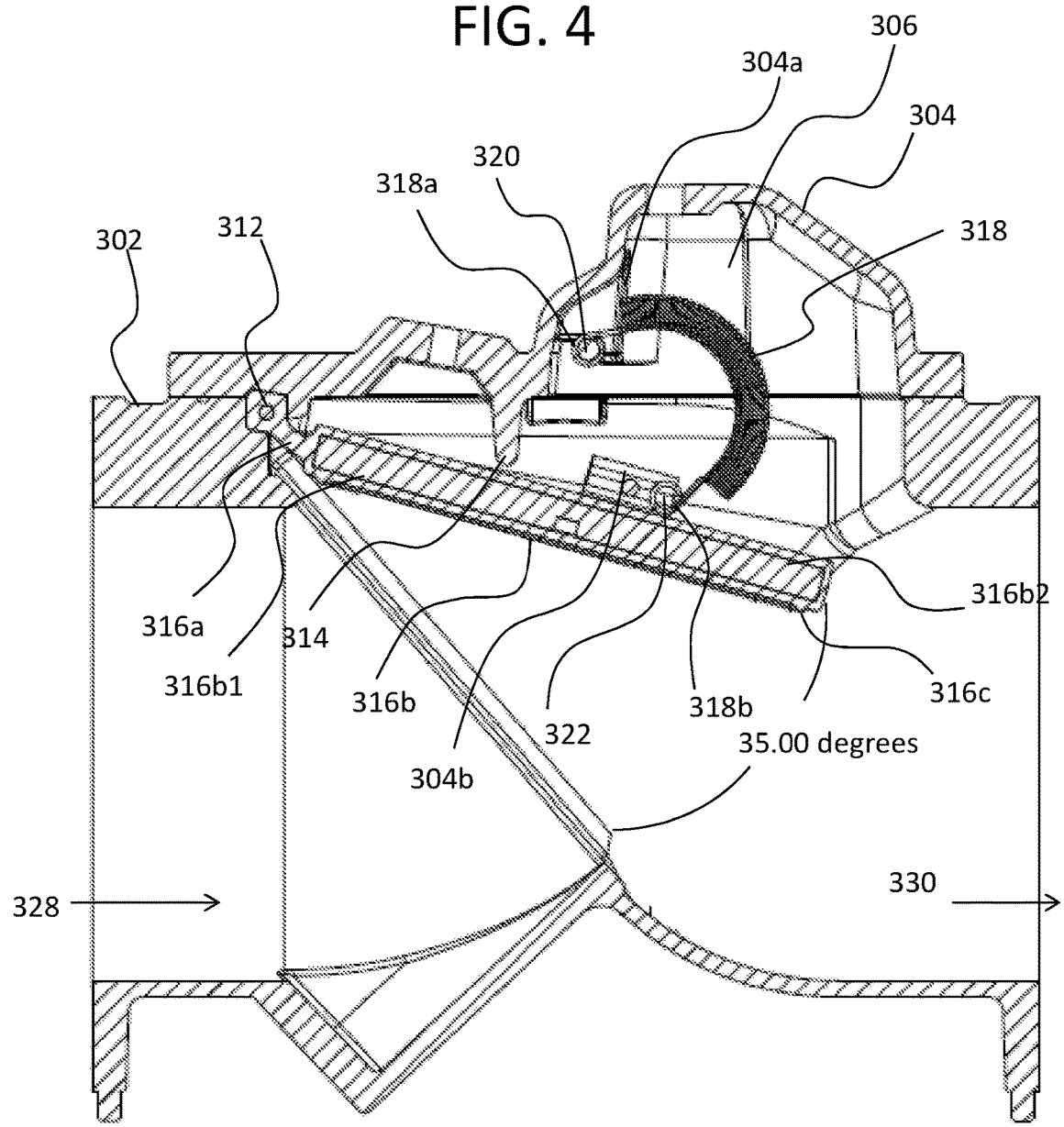
FIG. 4 shows the check valve according to the embodiment of FIG. 3 in the fully opened position.

FIG. 4 illustrates the positioning of the buckling spring 318 as the second portion 316b of the disc 316 swings to the fully opened position of the valve 300. More specifically, the buckling spring 318 folds into the cavity 306 of the cover 304 as the second portion 316b of the disc 316 swings toward the cover protrusion 314. As pointed out above, the buckling spring 318 always folds into the cavity 306 as a result of the off center positioning of the eyelets 318a and 318b with respect to the body of the buckling the spring 318. The buckling spring 318 is designed to provide a predetermined amount of force on the second portion 316b of the disc 316 based on the amount of flow of fluid through the valve 300. As pointed out above, this is caused as a result of the increasing resistance of the buckling spring 318 as the fluid flow diminishes (spring becomes more extended), and a decreasing resistance of the buckling spring 318 as the fluid flow increases (spring buckles more).

According to an example embodiment of the present inventive concept, as the force of fluid through the valve 300 is determined to be greater than a predetermined amount, additional springs 318 may be provided between the cover 304 and the second portion 316b of the disc 316 to increase the opposing force on the disc 316. This additional opposing force caused by additional springs 318 can cause the second portion 316b of the disc 316 to outpace the acceleration of the disc 316 toward the closed position due to a vacuum force of the fluid on the second portion 316b of the disc 316 as the fluid stops flowing and reverses its direction of flow. Furthermore, the cavity 306 within the cover 304 can be formed to a predetermined size so as to accommodate a single spring 318 or to accommodate a predetermined number of springs 318, depending on the fluid flow that the valve 300 is intended to control.

Naturally, when the flow of fluid through a valve either stops or reverses direction, the disc according to conventional valves will begin to rotate to the closed position. Moreover, the discs of conventional valves tend to accelerate as they rotate to the closed position due to either gravitational pull or a vacuum-type force on the disc caused by the reversal of fluid flow, thus causing a pressure surge or wave (also known as water hammer) as the conventional discs slam closed. As a result of this "water hammer" situation, a high risk of breaking the pipes and/or other damage, such as, for example, damage to the valve or disc itself can occur.

However, unlike the discs of conventional systems, the force applied to the second portion 316b of the disc 316 by the buckling spring 318 according to an example embodiment of the present inventive concept, can cause the disc 316 to outpace any acceleration that would be applied to it as a result of the gravitational force or a vacuum-type force caused by stopping and/or the reversal of the fluid flow. As pointed out above, the ability of the second portion 316b of the disc to outpace any acceleration applied thereto is due to the buckling force of the buckling spring(s) 318 (illustrated in FIGS. 3 and 4) as the bucking spring(s) 318 flexes back to its naturally extended position (see FIG. 3). As a result, during the operation of the second portion 316b of the disc 316 swinging back to the closed state, any acceleration of the second portion 316b of the disc 316 by reverse fluid flow is avoided, thus avoiding the possibility of pressure surges or waves, or any occurrence of water hammer. Therefore the buckling spring(s) 318 as described herein can prevent damage to the valve 300 as well as to the pipes connected thereto, while extending the life of the valve 300 by years, as a result of reducing any damage to the disc 316 caused by a force of acceleration applied to the disc 316 as the disc 316 slams shut. It is to be noted that the force of the buckling spring(s) 318 on the disc 316 is much less than the force on the disc 316 caused by a reversal of flow of the mass of fluid. Accordingly, although the force of the buckling spring(s) 318 are not as great as the force of a reversal of fluid flow, the buckling spring(s) 318 according to an example embodiment of the present inventive concept, and the positioning thereof within the cavity 306, can prevent slamming of the disc 326 by outpacing the acceleration of the disc 316 due to the force of a reversal of fluid flow.

Figure 5:
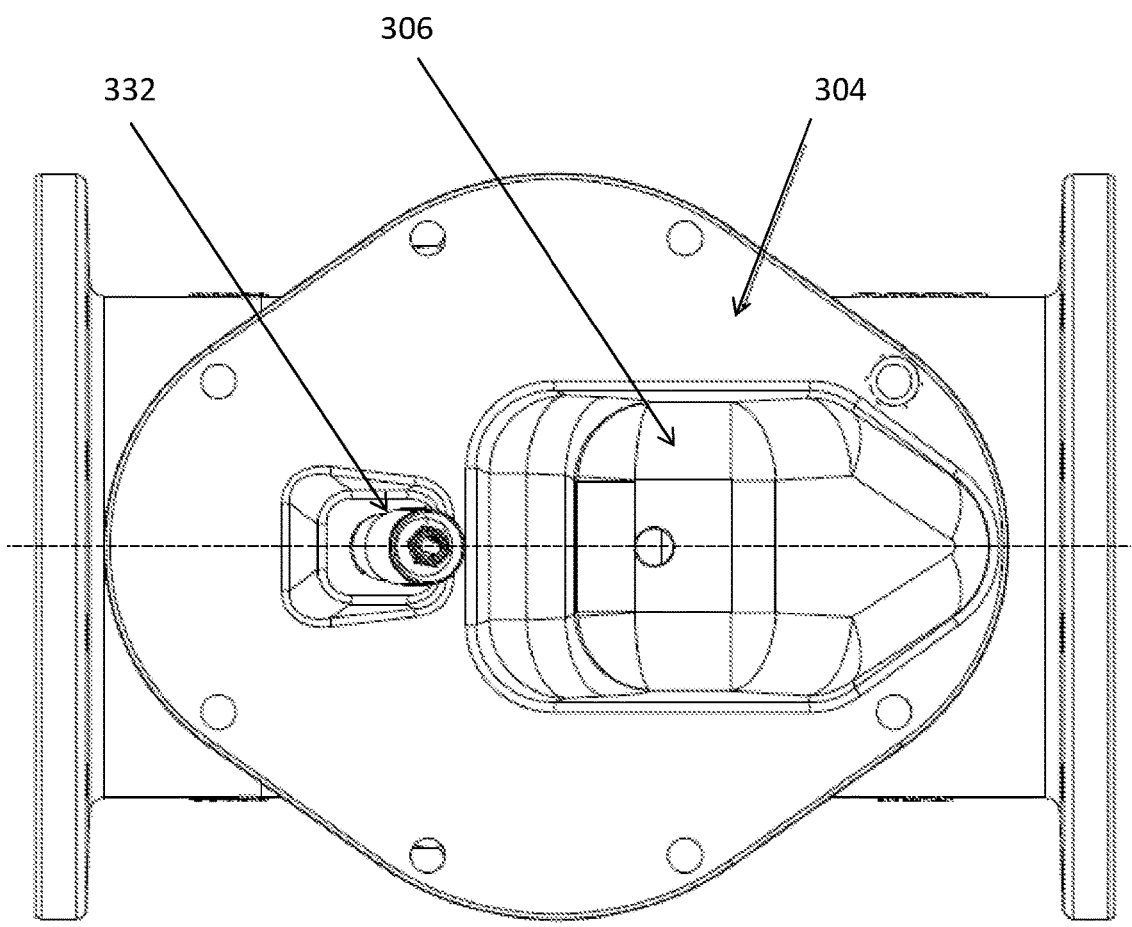
FIG. 5 shows a top view of a cover of the check valve according to the exemplary embodiment of FIG. 3.

FIG. 5 shows a top view of the cover 304 including an outer surface of the cover where the cavity 306 can be formed, as well as the positioning of the optional indicator 332.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A spring return check valve, comprising:
a valve body including an inlet and an outlet to define a fluid flow path therethrough,
a cover connected to a side of an opening in the body and including a cavity formed into a first surface thereof facing the opening, the cover configured to move between a position covering the opening and a position exposing the opening;
a disc disposed within the valve body and connected at one end of a first portion thereof to the valve body such that a second portion of the disc rotates between a position to open the fluid flow path and a position to close the fluid flow path; and a buckling spring connected between a surface of the disc and the cover.

2. The check valve of claim 1, wherein a recess is formed between the cover and the body in which the one end of the first portion of the disc is connected.

3. The check valve of claim 1, wherein the recess is disposed between the cover and the valve body.

4. The check valve of claim 1, wherein the valve body includes a seat extending therein configured to be contacted by the second portion of the disc when the fluid flow path is closed.

5. The check valve of claim 4, wherein the cover further comprises:

a projection extending from the first surface thereof and configured to limit the rotation of the second portion of the disc by a predetermined amount away from the seat to the fully opened position of the fluid flow path.

6. The check valve of claim 1, wherein the buckling spring includes a straight coil body including eyelets integrally extending from each end thereof, the eyelets being offset from the spring body in a same direction with respect to body such that the buckling spring buckles in a direction opposite to the direction in which the eyelets are offset and into the cavity of the cover when the second portion of the disc rotates toward the open position of the fluid flow path.

7. The check valve of claim 1, wherein the first portion of the disc is formed of a flexible material such that the one end connected to the valve body does not rotate while the second portion of the disc rotates.

8. The check valve of claim 1, further comprising:

a first spring hinge pin connected to the disc and configured to extend through one of the eyelets of the buckling spring and a second spring hinge pin connected to the cover and configured to extend through the other one of the eyelets of the buckling spring, the two spring hinge pins extending in parallel.

9. The check valve of claim 8, wherein the first and second spring hinge pins include a rubber cap to securely extend over an end thereof to prevent the eyelets of the spring from sliding off the respective spring hinge pin.

10. A spring return check valve, comprising:

a valve body including a fluid flow path therethrough;

a cover rotatable to expose an opening in the valve body and to close the opening in the valve body, the cover including:

a cavity formed therein facing the fluid flow path; and a protrusion extending therefrom toward the fluid flow path;

a disc including:

a first portion having a first end and a second end, the first end secured in a recess formed between the valve body and the cover; and a second portion connected to the second end of the first portion and rotatable between a first position to close the fluid flow path and a second position in contact with the protrusion wherein the fluid flow path is fully opened; and a buckling spring connected between the disc and a surface of the cover within the cavity.

11. The check valve of claim 10, wherein the buckling spring includes a straight body portion including eyelets integrally extending from each end thereof that are offset to one side of the body to cause the spring to buckle in a direction opposite to the side of the body in which the eyelets are offset.

12. The check valve of claim 11, wherein the cover and the disc each include a spring retention member in which a respective eyelet of the spring is connected.

13. The check valve of claim 12, wherein the spring retention members include a spring hinge pin in which the respective eyelet slides onto.

14. The check valve of claim 10, wherein the first portion of the disc is formed of a flexible material such that the first end does not rotate within the recess when the second portion of the disc rotates between the first and second positions.

15. The check valve of claim 10, wherein the valve body includes a seat within the fluid flow path in which the second portion of the disc contacts when in the first position, and the protrusion is formed such that the rotation of the second portion of the disc away from the seat to the fully opened position of the fluid flow path allows the second portion of the disc to rotate by a predetermined amount.

16. The check valve of claim 15, wherein the rotation amount of the second portion of the disc is 35 degrees.

17. The check valve of claim 10, wherein the buckling spring is formed of stainless steel.

18. The check valve of claim 14, wherein the buckling spring is formed to increase a biasing force as the spring extends to a fully straight position.

19. The check valve of claim 14, wherein the second portion of the disc is formed of a non-flexible material.

20. A check valve, comprising:

a body including a fluid flow path extending therethrough, a cavity extending away from the fluid flow path, and a recess formed therein;

a disc including a flexible first portion having a first end secured within the recess and a second end connected to a second portion of the disc, the second portion of the disc configured to rotate between one position closing the fluid flow path and a second position fully opening the fluid flow path; and a buckling spring connected between the body and the disc and having a shape which causes the spring to buckle into the cavity as the disc rotates toward the open position.

21. The check valve of claim 20, where in the body further includes:

a protrusion extending into the fluid flow path to limit the rotation of the second portion of the disc toward the second position by a predetermined amount.

22. The check valve of claim 21, wherein the buckling spring includes a straight coil body including an eyelet integrally extending from each end thereof, each eyelet being offset from the body to cause the spring to buckle in a predetermined direction when the eyelets are forced toward each other.

* * * * *